US012087530B2

(12) United States Patent
Kim

(10) Patent No.: US 12,087,530 B2
(45) Date of Patent: Sep. 10, 2024

(54) APPARATUS FOR SEPARATING POWER NET USING LATCH RELAY AND METHOD THEREOF

(71) Applicants: HYUNDAI MOTOR COMPANY, Seoul (KR); Kia Corporation, Seoul (KR)

(72) Inventor: Jong Joo Kim, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 297 days.

(21) Appl. No.: 17/584,648

(22) Filed: Jan. 26, 2022

(65) Prior Publication Data

US 2022/0415598 A1 Dec. 29, 2022

(30) Foreign Application Priority Data

Jun. 29, 2021 (KR) ........................ 10-2021-0084604

(51) Int. Cl.
*G05F 1/40* (2006.01)
*H01H 47/22* (2006.01)
*H01H 50/14* (2006.01)
*H01H 50/44* (2006.01)

(52) U.S. Cl.
CPC ............ *H01H 50/44* (2013.01); *H01H 47/22* (2013.01); *H01H 50/14* (2013.01)

(58) Field of Classification Search
CPC ......... H02H 50/44; H02H 50/14; H02H 47/22
See application file for complete search history.

(56) References Cited

U.S. PATENT DOCUMENTS 6,233,132 B1 * 5/2001 Jenski ...................... H01H 9/56 361/160
2010/0103576 A1 * 4/2010 Sugimoto .......... H03K 17/0822 361/84
2016/0325635 A1 * 11/2016 Masuda .................. B60L 53/66
2019/0011942 A1 * 1/2019 Hsieh ......................... H02J 7/02
2020/0324664 A1 * 10/2020 Kanzaki .................. B60L 58/12

* cited by examiner

*Primary Examiner* — Jared Fureman
*Assistant Examiner* — Esayas G Yeshaw
(74) *Attorney, Agent, or Firm* — MORGAN, LEWIS & BOCKIUS LLP

(57) ABSTRACT

The present disclosure relates to a power grid separating apparatus using a latch relay and a method thereof. An exemplary embodiment of the present disclosure provides a power net separating apparatus including: a switch configured to have a first end connected to a first power source and a second end connected to a second power source; a latch relay coil configured to control on and off of the switch; a first signal terminal connected to the first power source; a second signal terminal to which a connection signal for opening the switch is applied; a third signal terminal configured to serve as a power terminal of the latch relay coil; a fourth signal terminal to which a blocking signal for closing the switch is applied; and a fifth signal terminal connected to the second power source.

11 Claims, 6 Drawing Sheets

--RELATED ART--

APPARATUS FOR SEPARATING POWER NET USING LATCH RELAY AND METHOD THEREOF

CROSS-REFERENCE TO RELATED APPLICATION

This application claims the benefit of priority to Korean Patent Application No. 10-2021-0084604, filed on Jun. 29, 2021 with the Korean Intellectual Property Office, the entire contents of which are incorporated herein by reference.

TECHNICAL FIELD

The present disclosure relates to a power grid separating apparatus using a latch relay and a method thereof, and more particularly, to a technique for performing power grid separation by using a passive element without a control element.

BACKGROUND

When autonomous driving level 3 or higher or an automatic control system such as steer-by wire is applied, redundancy of a controller or an actuator is required to respond to failure situations such as controller failure, power line disconnection, or short circuit, and in particular, in order to respond to power line failures (disconnection, short circuit), large power blocking controllers such as PSU/PSG for power redundancy and power grid separation have been developed and applied.

Such large power blocking controllers such as a PSU and a PSG are semiconductor-based controller type devices, and due to the need for a large-capacity semiconductor and components such as a gate driver, a MCU, and a regulator to control it, a cost and volume increase, which may become a problem during packaging.

In addition, FIG. 1 illustrates a general latch relay driving circuit, and after monitoring a voltage at opposite ends of a relay switching element 11 through terminals Va and Vb in a MCU 12, power of A and B may be connected or disconnected by applying a current to a coil end with a set or reset signal terminal SET or RESET through a relay driver (LSD) 13 if necessary and turning on or off the relay with a magnetic force of the coil.

As such, the general latch relay driving circuit includes the MCU 12 and the relay driver 13, thereby increasing the cost and volume.

The above information disclosed in this Background section is only for enhancement of understanding of the background of the disclosure, and therefore, it may contain information that does not form the prior art that is already known in this country to a person of ordinary skill in the art.

SUMMARY

An exemplary embodiment of the present disclosure has been made in an effort to provide a power grid separating apparatus using a latch relay and a method thereof, capable of separating a power grid using a latch relay without a control element, thereby reducing a cost and a size to improve package freedom, and being free from ambient temperature and waterproof problems.

The technical objects of the present disclosure are not limited to the objects mentioned above, and other technical objects not mentioned can be clearly understood by those skilled in the art from the description of the claims.

An exemplary embodiment of the present disclosure provides a power grid separating apparatus including: a switch configured to have a first end connected to a first power source and a second end connected to a second power source; a latch relay coil configured to control on and off of the switch; a first signal terminal connected to the first power source; a second signal terminal to which a connection signal for opening the switch is applied; a third signal terminal configured to serve as a power terminal of the latch relay coil; a fourth signal terminal to which a blocking signal for closing the switch is applied; and a fifth signal terminal connected to the second power source.

In an exemplary embodiment, the first signal terminal and the third signal terminal may be connected, the second signal terminal and the fifth signal terminal may be connected, and the fourth signal terminal and the fifth signal terminal may be connected.

In an exemplary embodiment, the apparatus may further include: a first diode disposed between the second signal terminal and the fifth signal terminal; and a second diode disposed between the fourth signal terminal and the fifth signal terminal.

In an exemplary embodiment, when a potential difference between the first power source and the second power source is smaller than or equal to a predetermined reference value, the switch may maintain an original state because no current flows in the latch relay coil.

In an exemplary embodiment, when the second power source is short-circuited, a current may flow from the first power source to the third signal terminal through the first signal terminal, and may flow from the third signal terminal via the latch relay coil to the second power source through the fourth signal terminal, to open the switch such that the first power source and the second power source are separated from each other.

In an exemplary embodiment, the apparatus may further include a first diode configured to prevent a current from flowing from the second power source to the second signal terminal.

In an exemplary embodiment, when the first power source is short-circuited, a current may flow from the fifth signal terminal to the first power source through the third signal terminal and the first signal terminal sequentially via the second signal terminal and the latch relay coil, to open the switch such that the first power source and the second power source are separated from each other.

In an exemplary embodiment, the apparatus may further include a second diode configured to prevent a current from flowing from the fourth signal terminal to the first power source.

A power grid separating method for connecting or separating a first power source and a second power source using the apparatus of the present disclosure may include: maintaining a state of a switch when a potential difference between the first power source and the second power source is smaller than or equal to a predetermined reference value; and opening the switch when a potential difference between the first power source and the second power source is greater than the predetermined reference value.

According to an exemplary embodiment, in the opening of the switch, when the second power source is short-circuited, a current flows from the first power source to the third signal terminal through the first signal terminal, and flows from the third signal terminal via the latch relay coil to the second power source through the fourth signal terminal, to open the switch such that the first power source and the second power source are separated from each other.

According to an exemplary embodiment, in the opening of the switch, when the first power source is short-circuited, a current flows from the fifth signal terminal to the first power source through the third signal terminal and the first signal terminal sequentially via the second signal terminal and the latch relay coil, to open the switch such that the first power source and the second power source are separated from each other.

According to the present technique, it is possible to separate a power grid using a latch relay without a control element, thereby reducing a cost and a size to improve package freedom, and to be free from ambient temperature and waterproof problems. In addition, various effects that can be directly or indirectly identified through this document may be provided.

DETAILED DESCRIPTION OF THE EMBODIMENTS

Figure 1:
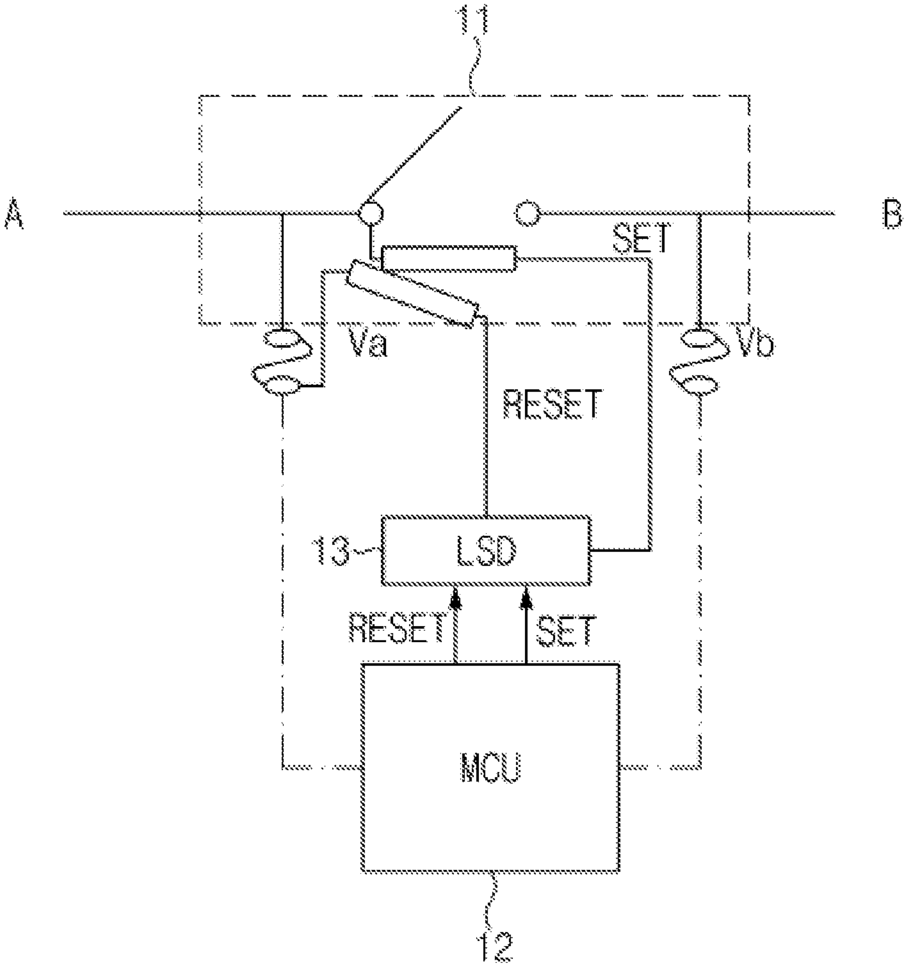
FIG. 1 illustrates a general latch relay driving circuit diagram.

Hereinafter, some exemplary embodiments of the present disclosure will be described in detail with reference to exemplary drawings.

It should be noted that in adding reference numerals to constituent elements of each drawing, the same constituent elements have the same reference numerals as possible even though they are indicated on different drawings.

In addition, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to an exemplary embodiment of the present disclosure, terms such as first, second, A, B, (a), and (b) may be used.

These terms are only for distinguishing the constituent elements from other constituent elements, and the nature, sequences, or orders of the constituent elements are not limited by the terms.

In addition, all terms used herein including technical scientific terms have the same meanings as those which are generally understood by those skilled in the technical field to which the present disclosure pertains (those skilled in the art) unless they are differently defined.

Terms defined in a generally used dictionary shall be construed to have meanings matching those in the context of a related art, and shall not be construed to have idealized or excessively formal meanings unless they are clearly defined in the present specification.

Hereinafter, exemplary embodiments of the present disclosure will be described in detail with reference to FIG. 2 to FIG. 6.

A power grid separating apparatus according to an exemplary embodiment of the present disclosure may connect or disconnect a power grid by using a latch relay circuit.

A relay or electro-magnetic contactor is a kind of electrical circuit switchgear that transfers mechanical drive and current signals by using the principle of an electromagnet, and is installed in various industrial facilities, machines, and vehicles.

Among relays, a latch relay in particular maintains a switched state even when no energy is supplied after operation, and is also called a bi-stable relay.

The latch relay is typically formed to have a structure operated by a permanent magnet and a solenoid actuator.

Figure 2:
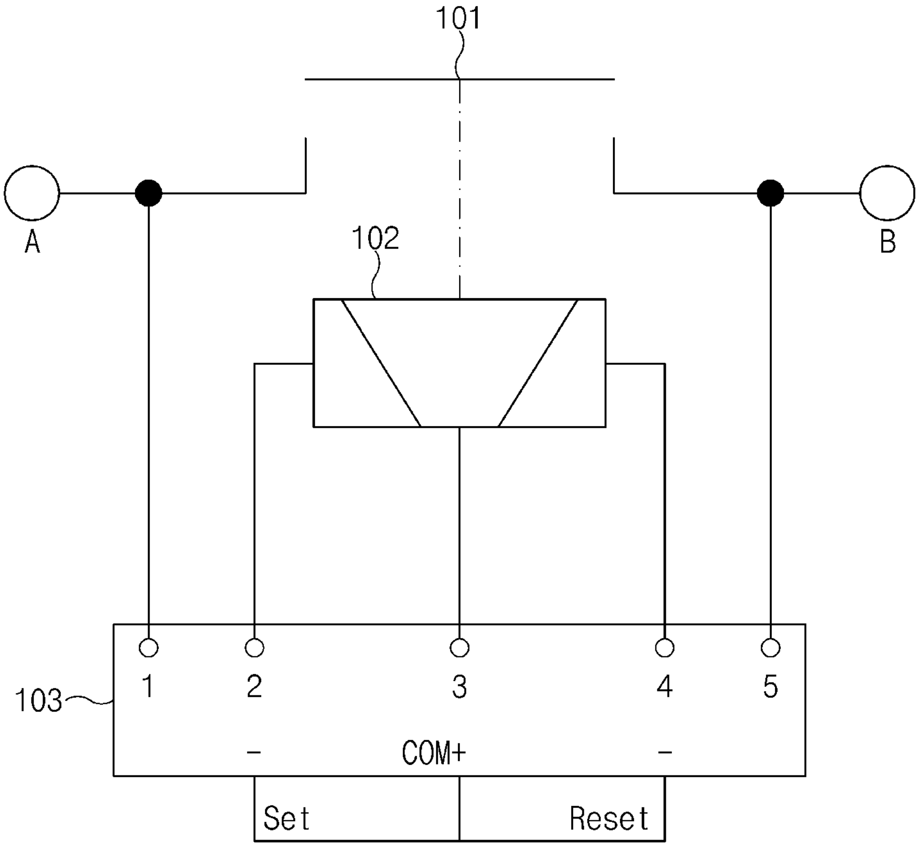
FIG. 2 illustrates a latch relay circuit diagram that is applied to a power grid separating apparatus according to an exemplary embodiment of the present disclosure.
Figure 3:
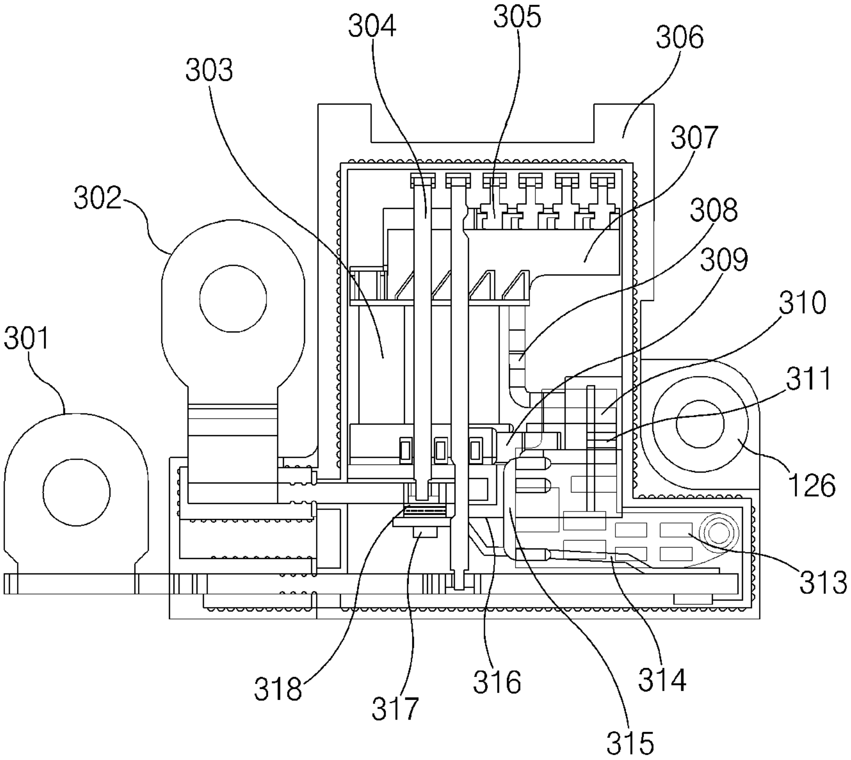
FIG. 3 illustrates a latch relay configuration diagram that is applied to a power grid separating apparatus according to an exemplary embodiment of the present disclosure.

The latch relay circuit applied to the power grid separating apparatus according to the present disclosure may be implemented as illustrated in FIG. 2 and FIG. 3.

FIG. 2 illustrates a latch relay circuit diagram that is applied to a power grid separating apparatus according to an exemplary embodiment of the present disclosure.

Referring to FIG. 2, a latch relay that is applied to the power grid separating apparatus according to an exemplary embodiment of the present disclosure includes a switch 101, a latch relay coil 102, and a signal terminal 103, and the power source A (first power source), and the power source B (second power source) may be connected or disconnected through the switch 101.

A first side of the switch 101 is connected to the power source A, a second side thereof is connected to the power source B, and is opened and closed to separate the power source A and the power source B.

The latch relay coil 102 controls on and off of the switch 101.

The signal terminal 103 includes a first signal terminal 1 connected to the power source A, a second signal terminal 2 to which a connection signal for opening of the switch 101 is applied, a third signal terminal 3 which is a power terminal of the latch relay coil 102, a fourth signal terminal 4 to which a blocking signal for closing the switch is applied, and a fifth signal terminal 5 connected to the power source B.

That is, A refers to a fixed terminal to which a large current is applied, and B refers to a movable terminal to which a large current is applied, and in the signal terminal 103, No. 1 refers to a fixed terminal monitoring port, No. 2 refers to a relay connection signal terminal, No. 3 refers to a relay coil power terminal (12V), No. 4 refers to a relay blocking signal terminal, and No. 5 refers to a movable terminal monitoring port.

As such, the latch relay applied to the power grid separating apparatus according to an exemplary embodiment of the present disclosure may not include a control device such as a separate MCU and a relay driver.

FIG. 3 illustrates a latch relay configuration diagram that is applied to a power grid separating apparatus according to an exemplary embodiment of the present disclosure.

Referring to FIG. 3, the latch relay includes a movable terminal 301, a fixed terminal 302, an electric wire 303, a signal terminal 304, a coil terminal 305, a base 306, a bobbin 307 in which coil is wound, a yoke 308 coupled to the bobbin 307 and formed of a magnetic material, an iron core 309, an armature 310, a permanent magnet 311, a collar 312, an actuator 313, a flat copper wire 314, a card 315, a movable spring 316, a movable contact 317 connected to the movable terminal 301, and a fixed contact 318 connected to the fixed terminal 302.

Such a latch relay has a same structure as that of a general latch relay, so a detailed description thereof will be omitted.

The latch relay coil 102 of FIG. 2 may include the base 306, the bobbin 307, the yoke 308, the iron core 309, the armature 310, the permanent magnet 311, the collar 312, the actuator 313, the flat copper wire 314, the card 315, and the movable spring 316.

The power grid separating apparatus 100 according to an exemplary embodiment of the present disclosure may be provided to separate a power of devices inside a vehicle.

In this case, the power grid separating apparatus 100 may be integrally formed with internal control units of the vehicle, or may be implemented as a separate device to be connected to control units of the vehicle by a separate connection means.

Particularly, the power grid separating apparatus 100 may be applied to an autonomous driving level 3 or higher vehicle or an autonomously controlled vehicle such as a steer-by-wire vehicle, and may prevent additional failures due to the occurrence of a power line failure by separating the power grid in the case of the power line failure such as disconnection or short circuit in the vehicle.

In addition, according to the present disclosure, system performance may be increased while maximizing cost savings by mechanically separating the power grid with only a passive element without using a control device that is sensitive to ambient temperature or water-resistance issues.

Figure 4:
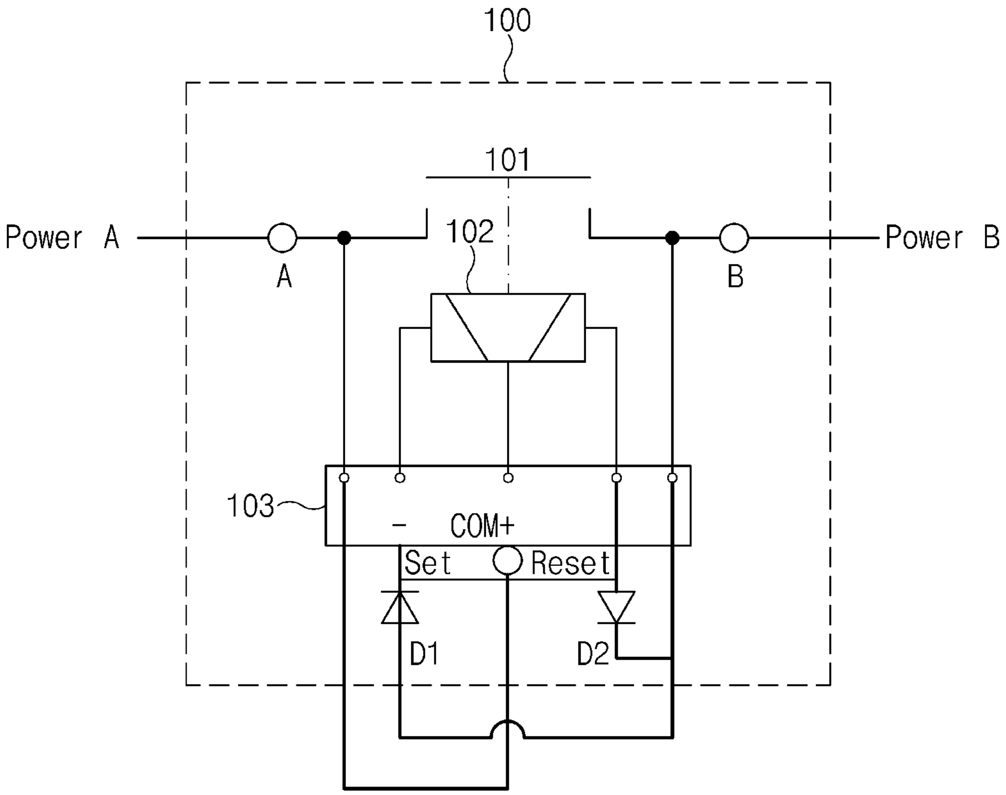
FIG. 4 illustrates schematic diagram showing a power grid separating apparatus according to an exemplary embodiment of the present disclosure.

FIG. 4 illustrates schematic diagram showing a power grid separating apparatus according to an exemplary embodiment of the present disclosure.

According to the prevent disclosure, a power grid separating apparatus may be configured as illustrated in FIG. 4 in order to drive a latch relay only with a passive circuit structure without a microcomputer when a characteristic of a dual power configuration and a potential difference between opposite ends thereof occurs is greater than or equal to a certain level.

It includes: a switch 101 that connects and disconnects terminals of a power source A (first power source) and a power source B (second power source) and a latch relay coil 102 for controlling on and off of the switch 101; and a signal terminal that includes a port for monitoring the power terminal A and the power terminal B, a relay connection signal terminal, a relay coil power terminal, and a relay blocking signal terminal.

In addition, the fixed terminal monitoring port 1 connected to the power terminal is connected to a common port, the movable terminal monitoring port 5 connected to the power terminal is connected to the relay connection signal (set signal) terminal 2, and the relay blocking signal terminal 4 and the movable terminal monitoring port 5 are connected.

In this case, a diode D1 is disposed between the relay connection signal terminal 2 and the movable terminal monitoring port 5, and a diode D2 is disposed between the relay blocking signal (reset signal) terminal 4 and the movable terminal monitoring port 5.

In this case, the diodes D1 and D2 may be provided to prevent reverse currents.

Figure 5:
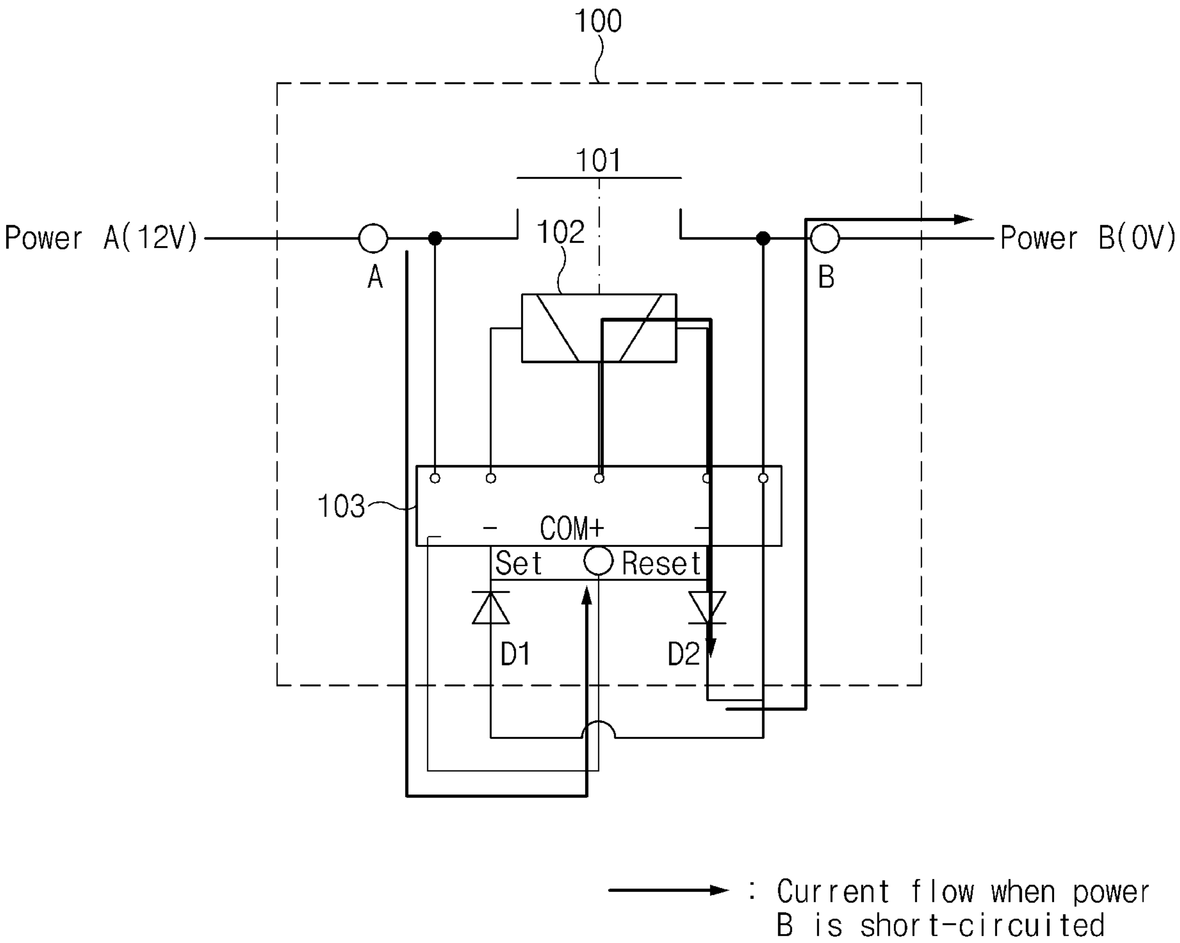
FIG. 5 illustrates a view for describing a method of mechanically separating a power grid when a power A is short-circuited according to an exemplary embodiment of the present disclosure.

FIG. 5 illustrates a view for describing a method of mechanically separating a power grid when a power source A is short-circuited according to an exemplary embodiment of the present disclosure.

When the relay is initially stocked, the relay switch 101 is in a set (connected) state, and a state of the switch 101 may change later depending on a potential difference between the power source A and the power source B.

Referring to FIG. 5, when the potential difference between the power source A and the power source B is smaller than or equal to a predetermined reference value, there is no current flow in the latch relay coil 102, and thus the switch 101 maintains the set state of the stocked state.

In this case, the reference value may be determined in advance by experimental values.

However, when the potential difference between the power source A and the power source B exceeds the predetermined reference value, it may cause a malfunction, so the switch must be opened.

When the power source A is 12 V and the power source B is connected to a ground (short circuit) to lower the voltage, i.e., when the potential difference between the power source A and the power source B is very large, a current is applied from the fixed terminal monitoring port 1 connected to a first power source to the common port 3, and flows from the common port 3 to a terminal of the power source B through the port 4, and in this case, the current flows through a latch relay reset coil terminal, and thus the latch relay switch 101 is opened, and the power source A and the power source B are separated from each other.

In this case, the diode D1 prevents the current from flowing from the power source B to the relay connection signal terminal 2.

Figure 6:
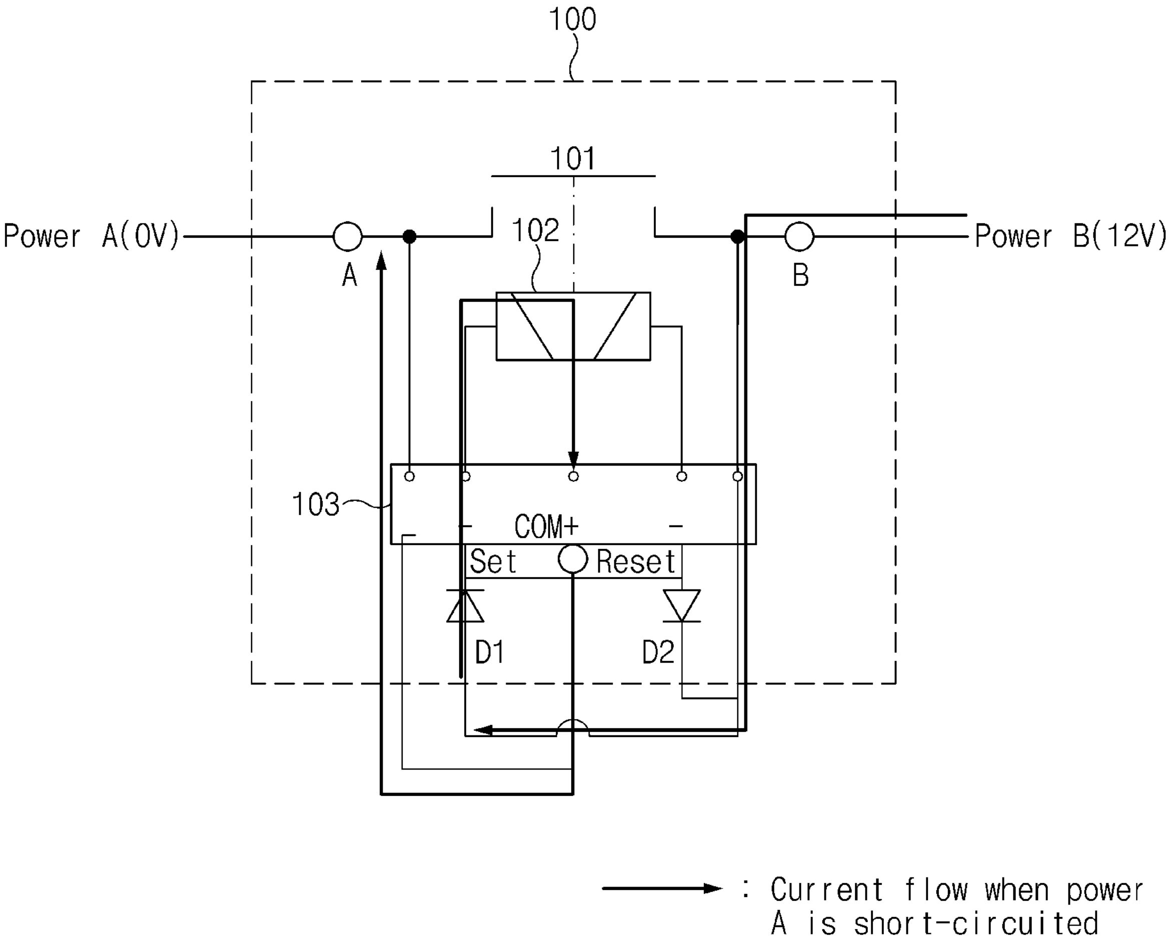
FIG. 6 illustrates a view for describing a method of separating a power grid when a power B is short-circuited according to an exemplary embodiment of the present disclosure.

FIG. 6 illustrates a view for describing a method of separating a power grid when a power source B is short-circuited according to an exemplary embodiment of the present disclosure.

Conversely, as illustrated in FIG. 6, when the power source B is 12 V and the power source A is connected to the ground (short circuit) to lower the voltage, a current flows from the movable terminal monitoring port 5 of the power source B to the fixed terminal monitoring port 1 of the power source A through the relay connection signal terminal 2.

In this case, the current flows in an opposite direction to a coil terminal of the latch relay set, so that the latch relay switch 101 is opened, and the power source A and the power source B are separated from each other.

At this time, when the current at opposite ends of the coil is reversed, an electromagnetic force is generated in the opposite direction, so that the set coil serves as a reset.

In this case, the diode D2 prevents the current from flowing from the relay blocking signal terminal 4 to a second power source.

As such, according to the present disclosure, the power grid may be separated using a latch relay, the system cost may be lowered because a control element such as a MCU or a relay driver are not required, it is free from ambient temperature and waterproof problems by eliminating the control element, and the overall size may also be reduced to optimize a package freedom degree.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments.

The protection range of the present disclosure should be interpreted by the claims below, and all technical ideas within the equivalent range should be interpreted as being included in the scope of the present disclosure.

What is claimed is:

1. A power grid separating apparatus comprising:

a switch configured to have a first end connected to a first power source and a second end connected to a second power source;

a latch relay coil configured to control on and off of the switch;

a first signal terminal connected to the first power source;

a second signal terminal to which a connection signal for opening the switch is applied;

a third signal terminal configured to serve as a power terminal of the latch relay coil;

a fourth signal terminal to which a blocking signal for closing the switch is applied; and a fifth signal terminal connected to the second power source.

2. The power grid separating apparatus of claim 1, wherein the first signal terminal and the third signal terminal are connected to each other, the second signal terminal and the fifth signal terminal are connected to each other, and the fourth signal terminal and the fifth signal terminal are connected to each other.

3. The power grid separating apparatus of claim 2, further comprising:

a first diode disposed between the second signal terminal and the fifth signal terminal; and a second diode disposed between the fourth signal terminal and the fifth signal terminal.

4. The power grid separating apparatus of claim 1, wherein, when a potential difference between the first power source and the second power source is smaller than or equal to a predetermined reference value, the switch maintains an original state because no current flows in the latch relay coil.

5. The power grid separating apparatus of claim 1, wherein, when the second power source is short-circuited, a current flows from the first power source to the third signal terminal through the first signal terminal, and flows from the third signal terminal via the latch relay coil to the second power source through the fourth signal terminal, to open the switch such that the first power source and the second power source are separated.

6. The power grid separating apparatus of claim 5, further comprising a first diode configured to prevent a current from flowing from the second power source to the second signal terminal.

7. The power grid separating apparatus of claim 1, wherein when the first power source is short-circuited, a current flows from the fifth signal terminal to the first power source through the third signal terminal and the first signal terminal sequentially via the second signal terminal and the latch relay coil, to open the switch such that the first power source and the second power source are separated.

8. The power grid separating apparatus of claim 7, further comprising:

a second diode configured to prevent a current from flowing from the fourth signal terminal to the first power source.

9. A power grid separating method for connecting or separating a first power source and a second power source using the apparatus of claim 1, the method comprising:

maintaining a state of a switch when a potential difference between the first power source and the second power source is smaller than or equal to a predetermined reference value; and opening the switch when a potential difference between the first power source and the second power source is greater than the predetermined reference value.

10. The power grid separating method of claim 9, wherein in the opening of the switch, when the second power source is short-circuited, a current flows from the first power source to the third signal terminal through the first signal terminal, and flows from the third signal terminal via the latch relay coil to the second power source through the fourth signal terminal, to open the switch such that the first power source and the second power source are separated from each other.

11. The power grid separating method of claim 9, wherein in the opening of the switch, when the first power source is short-circuited, a current flows from the fifth signal terminal to the first power source through the third signal terminal and the first signal terminal sequentially via the second signal terminal and the latch relay coil, to open the switch such that the first power source and the second power source are separated from each other.

* * * * *